(No Model.)

G. W. LARAWAY.
Car Brake.

No. 237,758. Patented Feb. 15, 1881.

Witnesses:
S. N. Piper,
Wm W. Hunt.

Inventor:
George W. Laraway,
by R. H. Eddy, atty.

UNITED STATES PATENT OFFICE.

GEORGE W. LARAWAY, OF HARTFORD, CONNECTICUT, ASSIGNOR OF ONE-HALF TO HIMSELF AND GEORGE H. WILLIAMS, OF NEWTON, MASS.

CAR-BRAKE.

SPECIFICATION forming part of Letters Patent No. 237,758, dated February 15, 1881.

Application filed August 4, 1880. (No model.)

*To all whom it may concern:*

Be it known that I, GEORGE W. LARAWAY, of the city and county of Hartford, and State of Connecticut, have invented a new and useful Improvement in Mechanism for Operating the Brakes of the Wheels of a Railway-Carriage; and I do hereby declare the same to be described in the following specification and represented in the accompanying drawings, of which—

Figure 1:
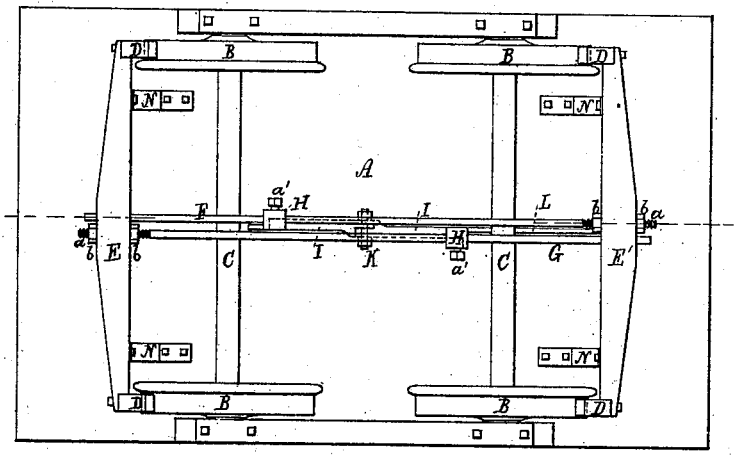
Figure 2:
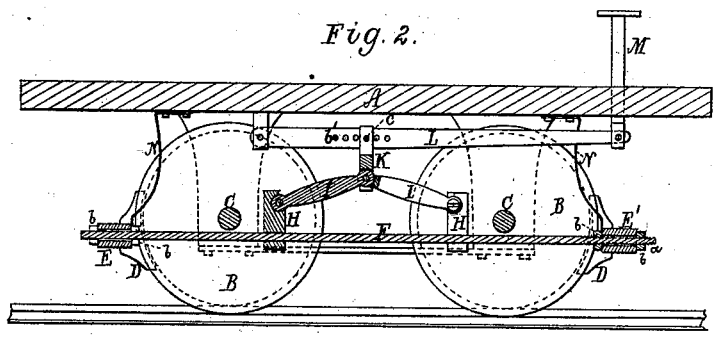
Figure 3:
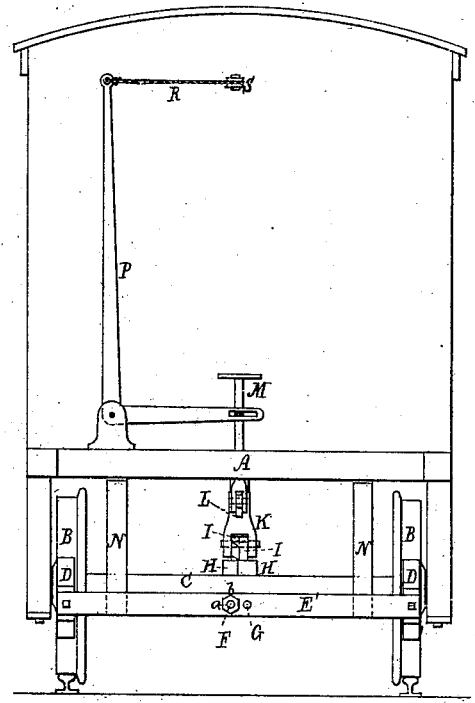

Figure 1 is an under-side view of the platform or truck of a railway-carriage with its wheels and my improved mechanism for actuating the brakes thereof. Fig. 2 is a longitudinal section, showing the said mechanism. Fig. 3 is an end view of a carriage, showing a knee-lever as applied to it and the pedal hereinafter described.

The nature of my invention is particularly defined in the claims hereinafter presented.

In the drawings, A denotes the platform or truck; B, its four wheels; C C, their axles; D, the brakes, and E E' the support-bars of such brakes, all being arranged as represented.

From one brake-bar, E, to the other, E', there are extended two rods, F G, each of which is connected with one of the bars E and extends loosely through the other, the connections being by screws $a$ and nuts $b$, arranged as shown.

There is adapted to slide on each of the rods F G one of two toggle-carriers, H, each being provided with one or more devices or clamp-screws, $a'$, for fastening it in place on the rod. These carriers, arranged as shown, are jointed to two toggles, I I, at or near their outer ends, the said toggles, at or near their inner ends, being jointed together and to a pitman, K, jointed to and extending from a long lever, L. This lever is fulcrumed to the platform and arranged beneath it, and jointed to a foot-piece or pedal, M, arranged with respect to the platform in manner as shown. The said lever L is provided with a series of holes, as represented at $b'$, to receive the joint-pin $c$ of the pitman.

On a brakeman or driver placing his foot upon the pedal and pressing it downward, the toggles will be so moved as to cause both the brake-bars to be simultaneously drawn toward each other and the brakes to be borne against the treads of the wheels. The movement of the brake-bars in the opposite directions to force the brakes out of action on the wheels may be effected by springs N, extending from the said bars to the platform, and serving as supports for the bars.

In Fig. 3, P denotes a knee-lever, fulcrumed to the carriage-body and jointed or properly applied to the pedal. A rope or chain, R, attached to the upper arm of the said lever, and going partly about a sheave, S, serves, on being pulled, to cause the pedal to be depressed. The addition of the said lever and its adjuncts to the pedal enables the brake-operative mechanism to be put in action otherwise than by manual power directly applied to the pedal.

The adjustable toggle-carriers enable the toggles to be properly adjusted relatively to the slide-bars, so the series $b'$ of holes in the lever L admit of the pitman being jointed to the lever at different distances from its fulcrum, as occasion may require.

The described mechanism for operating the brakes of a railway-carriage is simple in construction and very efficient in practice.

What I claim as my invention is as follows, viz:

1. The combination of the lever L, pitman K, toggles I, and slide-rods F G, arranged and adapted to the carriage or truck platform A and the brake-supporting bars E E', all substantially as set forth.

2. The lever L, provided with the range or series $b'$ of pitman-pin-receiving holes, in combination with the pitman K, toggles I, and slide-rods F G, all being arranged with and applied, substantially as set forth, to the brake-support bars and the truck or platform A of a railway-carriage.

GEORGE W. LARAWAY.

Witnesses:
R. H. EDDY,
WM. W. LUNT.